United States Patent
Oba et al.

(10) Patent No.: US 8,446,923 B2
(45) Date of Patent: May 21, 2013

(54) FIBER LASER DEVICE

(75) Inventors: Yasuhiro Oba, Sakura (JP); Michihiro Nakai, Sakura (JP)

(73) Assignee: Fujikura Ltd., Tokyo (JP)

(\*) Notice: Subject to any disclaimer, the term of this patent is extended or adjusted under 35 U.S.C. 154(b) by 0 days.

(21) Appl. No.: 13/467,362

(22) Filed: May 9, 2012

(65) Prior Publication Data

US 2012/0263198 A1 Oct. 18, 2012

Related U.S. Application Data (63) Continuation of application No. PCT/JP2010/069786, filed on Nov. 8, 2010.

(30) Foreign Application Priority Data

Nov. 9, 2009 (JP) ................................. 2009-256565

(51) Int. Cl.
- *H01S 3/30* (2006.01)
- *H01S 3/10* (2006.01)
- *H01S 3/13* (2006.01)
- *H01S 3/00* (2006.01)

(52) U.S. Cl.
USPC ............ 372/6; 372/25; 372/29.02; 372/31.08

(58) Field of Classification Search
USPC .................. 372/21–22, 6, 25, 29.012, 29.02, 372/30, 38.01–38.02, 38.06–38.07
See application file for complete search history.

(56) References Cited

U.S. PATENT DOCUMENTS

| | | | |
|---|---|---|---|
| 6,330,258 B1 | 12/2001 | Kawamura | |
| 2008/0030847 A1* | 2/2008 | Murison et al. | 359/341.3 |
| 2009/0103576 A1* | 4/2009 | Achtenhagen | 372/22 |
| 2011/0019705 A1* | 1/2011 | Adams et al. | 372/25 |

FOREIGN PATENT DOCUMENTS

| | | |
|---|---|---|
| JP | 2000-208841 A | 7/2000 |
| JP | 2000-340872 A | 12/2000 |
| JP | 2008-091773 A | 4/2008 |
| JP | 2010-115698 A | 5/2010 |

OTHER PUBLICATIONS

International Search Report of PCT/JP2010/069786, mailing date of Nov. 30, 2010.

\* cited by examiner

*Primary Examiner* — Jessica Stultz
*Assistant Examiner* — Phillip Nguyen
(74) *Attorney, Agent, or Firm* — Westerman, Hattori, Daniels & Adrian, LLP

(57) ABSTRACT

When an output instruction is input to the control unit, the control unit controls the seed laser light source and the pumping light source to be either in a pre-pumped state or in an output state. In the pre-pumped state, laser light is not output from the seed laser light source, and pumping light with a predetermined intensity based on a laser light intensity set by the output setting unit is output from the pumping light source for a certain period of time. In the output state, laser light is output from the seed laser light source, and pumping light is output from the pumping light source, so that laser light with the intensity set by the output setting unit is output.

6 Claims, 5 Drawing Sheets

FIBER LASER DEVICE

TECHNICAL FIELD

The invention relates to a fiber laser device.

BACKGROUND ART

In recent years, fiber laser devices have been used in processing machines for performing processing with laser light, medical devices such as surgical knives using laser light, and the like. In a fiber laser device, laser light generated from a laser oscillator and pumping light are input to an amplification optical fiber, and the amplified laser light is output from an output unit.

In such a fiber laser device, a certain period of time is required for the intensity of laser light to be stabilized from when the laser light is started to be output from the fiber laser device. That is, a certain period of time is required for laser light to rise.

As the rise time of laser light becomes shorter, the work efficiency becomes higher. Patent Document 1 listed below discloses a fiber laser device that requires a short period of time to stabilize laser light.

In the fiber laser device disclosed in Patent Document 1 listed below, pumping light with a low and constant intensity is input to an amplification optical fiber during a period before laser light is output from the fiber laser device (a standby period), and a rare-earth element doped in the amplification optical fiber. When laser light is output from the fiber laser device, seed laser light and pumping light with a high intensity are input to the amplification optical fiber. The seed laser light is then amplified, and the amplified laser light is output. In this manner, before laser light is output from the fiber laser device, the rare-earth element in the amplification optical fiber is pumped. Accordingly, the rise time of the laser light output from the fiber laser device is short (Patent Document 1).

CITATION LIST

Patent Document

[Patent Document 1] Japanese Patent Laid-Open Publication No. 2008-91773

SUMMARY OF THE INVENTION

Objects to be Achieved by the Invention

The fiber laser device disclosed in Patent Document 1 listed above has a short laser light rise time, but the laser light rise time varies, and there is room for improvement.

Therefore, an object of the invention is to provide a fiber laser device capable of restraining variations of the rise time of output laser light while shortening the rise time of the output laser light.

Means for Achieving the Objects

To achieve the above object, the inventors made intensive studies to find the causes of variations in the period required for the intensity of laser light to be stabilized from when the laser light is started to be output from the fiber laser device disclosed in Patent Document 1 listed above. As a result, the inventors discovered that the causes are such that the pumped state of the rare-earth element in the amplification optical fiber varies at the time when laser light is about to be output from the fiber laser device, and the pumped state is not associated with the pumping light that is input to the amplification optical fiber to output the laser light.

Specifically, in the fiber laser device disclosed in Patent Document 1 listed above, the pumped state of the rare-earth element in the amplification optical fiber might vary with the duration of the standby period in which pumping light is input to the amplification optical fiber to pump the rare-earth element. For example, where the standby period is very short, the rare-earth element in the amplification optical fiber is in a low pumped state at the time when laser light is output. Where the standby period is sufficiently long, the rare-earth element in the amplification optical fiber is in a high pumped state at the time when laser light is output. Regardless of the pumped state, seed laser light and pumping light are input to the amplification optical fiber, and laser light is then output from the fiber laser device. As a result, variations are caused in the period required for the intensity of laser light to be stabilized from when the laser light is started to be output from the fiber laser device.

In view of the above, the inventors paid attention to the relationship between the intensity of pumping light prior to a rise of laser light and the intensity of the pumping light at the time when the laser light is output, and achieved the invention.

Specifically, a fiber laser device according to the invention includes: a seed laser light source configured to output seed laser light; a pumping light source configured to output pumping light; an amplification optical fiber doped with a rare-earth element to be pumped by the pumping light and configured to receive the seed laser light and the pumping light, amplify the seed laser light, and output the amplified seed laser light as laser light; an output unit configured to output the laser light output from the amplification optical fiber; a control unit configured to control at least the seed laser light source and the pumping light source; an output setting unit configured to input, to the control unit, an output setting instruction to set an intensity of the laser light output from the output unit; and an output instructing unit configured to input, to the control unit, an output instruction to cause the output unit to output the laser light. When the output instruction is input to the control unit, the control unit controls the seed laser light source and the pumping light source so that the seed laser light source and the pumping light source are switched from a pre-pumped state to an output state. In the pre-pumped state, the seed laser light source does not output the seed laser light and the pumping light source outputs pumping light with a predetermined intensity based on the laser light intensity set by the output setting unit for a predetermined period of time. In the output state, the seed laser light source outputs the seed laser light, and the pumping light source outputs the pumping light, so that laser light with the intensity set by the output setting unit is output from the output unit.

According to this fiber laser device, when an output instruction is input from the output instructing unit to the control unit, the control unit puts the seed laser light source and the pumping light source into the pre-pumped state, controls the seed laser light source not to output seed laser light, and controls the pumping light source so that pumping light is input to the amplification optical fiber for a predetermined period of time. Therefore, the level of the pumped state of the rare-earth element in the amplification optical fiber is gradually made higher. The control unit then puts the seed laser light source and the pumping light source into the output state, so that pumping light and seed laser light are input to the amplification optical fiber. Since the level of the pumped state of the rare-earth element in the amplification optical fiber is made higher in the pre-pumped state, the rise time of the laser light that is output from the output unit can be made shorter in the output state.

The control unit also sets the intensity of the pumping light in the pre-pumped state at an intensity based on the laser light intensity that is set by the output setting unit. The intensity based on the laser light intensity set by the output setting unit is set as follows. In a case where the intensity of the pumping light in the output state is high as the intensity of the laser light output from the output unit in the output state is high, the intensity of the pumping light in the pre-pumped state is set at a high value. In a case where the intensity of the pumping light in the output state is low as the intensity of the laser light output from the output unit in the output state is low, the intensity of the pumping light in the pre-pumped state is set at a low value. Therefore, the pumped state of the rare-earth element at the end of the pre-pumped state is a high pumped state when the intensity of the laser light output from the output unit is high in the output state, and the pumped state is a low pumped state when the intensity of the laser light output from the output unit is low in the output state. Accordingly, in the output state, it is possible to restrain variations of the period from when laser light and pumping light are input to the amplification optical fiber until the laser light output from the output unit rises.

The above described fiber laser device preferably further includes: a wavelength converter provided between the amplification optical fiber and the output unit, and configured not to perform wavelength conversion on light generated and output from the amplification optical fiber by the pumping light in the pre-pumped state, and to perform wavelength conversion on the laser light output from the amplification optical fiber by the seed laser light and the pumping light in the output state; and a optical filter provided between the wavelength converter and the output unit, and configured, when light in the same wavelength band as the seed laser light is input to the wavelength converter, to pass light having a wavelength thereof converted by the wavelength converter and to restrain transmission of light not having a wavelength thereof converted by the wavelength converter.

The wavelength converter is constituted by an optical fiber that causes stimulated Raman scattering. In a case where the crest value of the intensity of input light is large, the wavelength converter converts the wavelength of the light into a longer wavelength, and then outputs the light having its wavelength converted. In a case where the crest value of the intensity of input light is small, this wavelength converter does not convert the wavelength of the light, and outputs the light without any change. Accordingly, in this fiber laser device, when laser light that is amplified by the amplification optical fiber is output in the output state, the wavelength of the laser light is converted by the wavelength converter since the crest value of the intensity is large. The laser light having its wavelength converted passes through the optical filter, and is output from the output unit. In the pre-pumped state, on the other hand, the rare-earth element in the amplification optical fiber is pumped by the pumping light. The amplification optical fiber is designed so that seed laser light output from the seed laser light source is amplified by stimulated emission from the rare-earth element pumped by the pumping light. In the pre-pumped state, however, the seed laser light is not input to the amplification optical fiber. Accordingly, only spontaneous emission light generated by the pumped rare-earth element is output from the amplification optical fiber. Since the crest value of the intensity of the spontaneous emission light is small, the wavelength of the spontaneous emission light is not converted by the wavelength converter, and transmission of light that is output from the wavelength converter and is input to the optical filter is restrained by the optical filter. In this manner, in the pre-pumped state, the output unit can be restrained from outputting unnecessary light.

Alternatively, a fiber laser device according to the invention includes: a seed laser light source configured to output seed laser light; a pumping light source configured to output pumping light; an amplification optical fiber doped with a rare-earth element to be pumped by the pumping light and configured to receive the seed laser light and the pumping light, amplify the seed laser light, and output the amplified seed laser light as laser light; an output unit configured to output the laser light output from the amplification optical fiber; a control unit that configured to control at least the seed laser light source and the pumping light source; an output setting unit configured to input, to the control unit, an output setting instruction to set an intensity of the laser light output from the output unit; and an output instructing unit configured to input, to the control unit, an output instruction to cause the output unit to output the laser light. When the output instruction is input to the control unit, the control unit controls the seed laser light source and the pumping light source so that the seed laser light source and the pumping light source are switched from a pre-pumped state to an output state. In the pre-pumped state, the seed laser light source outputs seed laser light with a very low intensity for a certain period of time, and the pumping light source outputs pumping light with a predetermined intensity based on the laser light intensity set by the output setting unit for the certain period of time. In the output state, the seed laser light source outputs the seed laser light and the pumping light source outputs the pumping light, so that laser light with the intensity set by the output setting unit is output from the output unit.

According to such a fiber laser device, seed laser light is input to the amplification optical fiber in the pre-pumped state. Accordingly, pumping of the rare-earth element by the pumping light and relaxing of the rare-earth element by the seed laser light can be balanced. Thus, it is possible to prevent the rare-earth element from being so pumped as to be unstable, and unintended laser oscillation can be restrained in the pre-pumped state.

Further, in the above fiber laser device, the seed laser light output from the seed laser light source in the output state may be pulsed light, and the seed laser light output from the seed laser light source in the pre-pumped state may be continuous light.

Also, the above described fiber laser device preferably further includes: a wavelength converter provided between the amplification optical fiber and the output unit and configured not to perform wavelength conversion on light output from the amplification optical fiber by the seed laser light and the pumping light in the pre-pumped state and to perform wavelength conversion on the laser light output from the amplification optical fiber by the seed laser light and the pumping light in the output state; and a optical filter provided between the wavelength converter and the output unit and configured, when light in a same wavelength band as the seed laser light is input to the wavelength converter, to pass light having its wavelength converted by the wavelength converter and to restrain transmission of light not having its wavelength converted by the wavelength converter.

According to such a fiber laser device, the seed laser light with the very low intensity that is input to the amplification optical fiber in the pre-pumped state is amplified by stimulated emission from the rare-earth element and is output from the amplification optical fiber. However, the wavelength converter is designed not to convert the wavelength of the light that is output from the amplification optical fiber at this point. Accordingly, the output unit is restrained from outputting laser light in the pre-pumped state.

Also, in the above described fiber laser device, the intensity of the pumping light in the pre-pumped state is preferably equal to or lower than the intensity of the pumping light in the output state.

Effects of the Invention

According to the invention, variations of the rise time of output laser light can be restrained while the rise time of the output laser light is shortened.

EMBODIMENTS OF THE INVENTION

Preferred embodiments of fiber laser devices according to the invention will be described in detail below with reference to the accompanying drawings.
(First Embodiment)
FIG. 1 is a diagram showing a fiber laser device according to a first embodiment of the invention.

Figure 1:
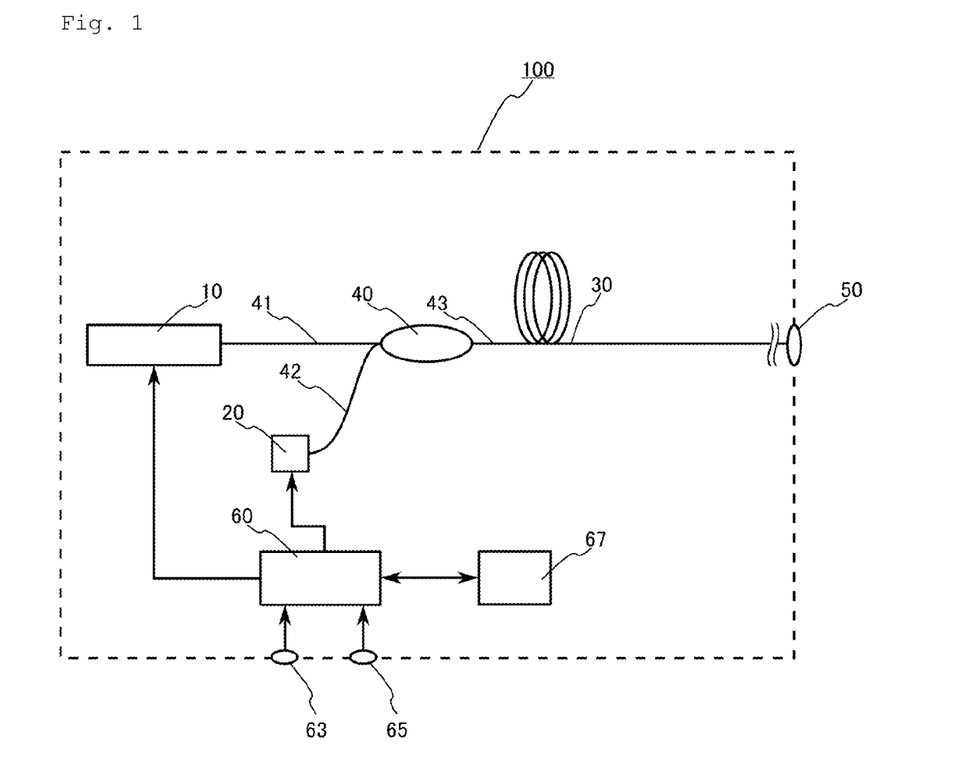
FIG. 1 is a diagram showing a fiber laser device according to a first embodiment of the invention.

As shown in FIG. 1, a fiber laser device 100 includes as main components: a seed laser light source 10 that outputs seed laser light at a wavelength $\lambda 1$; a pumping light source 20 that outputs pumping light; an amplification optical fiber 30 to which the pumping light and the seed laser light are input; an optical coupler 40 that inputs the pumping light and the seed laser light to the amplification optical fiber 30; an output unit 50 that outputs the light output from the amplification optical fiber 30; a control unit 60 that controls the seed laser light source 10 and the pumping light source 20; an output setting unit 63 that inputs the intensity of the laser light output from the output unit 50 to the control unit 60; an output instructing unit 65 that inputs an output instruction to the control unit 60 to cause the output unit 50 to output the laser light; and a memory 67 that stores the intensity of the pumping light output from the pumping light source 20 in accordance with the intensity of the laser light output from the output unit 50.

Figure 2:
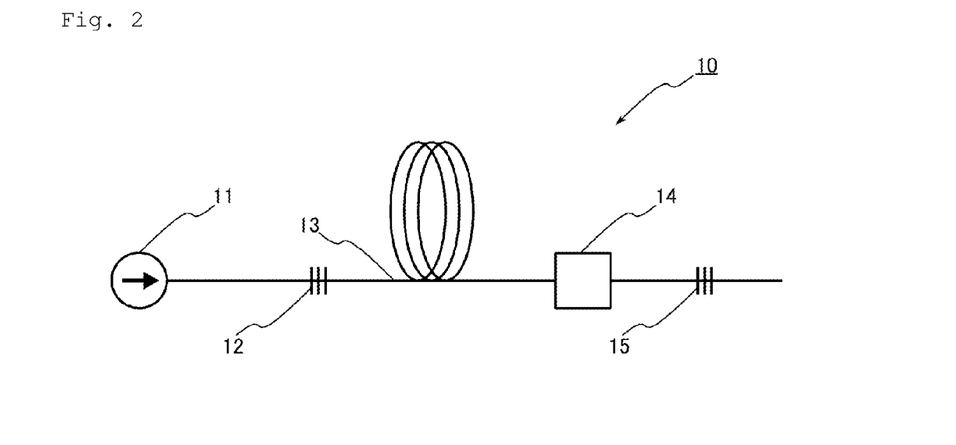
FIG. 2 is a diagram showing a seed laser light source in FIG. 1.

FIG. 2 is a diagram showing the seed laser light source 10 of FIG. 1. In this embodiment, a laser output device of a Fabry-Perot type is used as the seed laser light source 10. As shown in FIG. 2, the seed laser light source 10 includes: a laser oscillator 11 that outputs pumping light; a rare-earth doped fiber 13 to which the pumping light from the laser oscillator 11 is input; a first FBG (Fiber Bragg Grating) 12 provided between the rare-earth doped fiber 13 and the laser oscillator 11; a second FBG 15 provided on the opposite side of the rare-earth doped fiber 13 from the laser oscillator 11; and an AOM (Acoustic Optical Modulator) 14 provided between the second FBG 15 and the rare-earth doped fiber 13.

The laser oscillator 11 is a semiconductor laser, and outputs pumping light. The output pumping light has a wavelength of 975 nm, for example. The pumping light output from the laser oscillator 11 is input to the rare-earth doped fiber 13 via the first FBG 12. At the rare-earth doped fiber 13, the pumping light is absorbed by the rare-earth element doped in the rare-earth doped fiber 13. As a result, the rare-earth element enters a pumped state. The rare-earth element in the pumped state emits spontaneous emission light including a predetermined wavelength $\lambda 1$. Here, the wavelength $\lambda 1$ is 1064 nm, for example. The spontaneous emission light propagates through the rare-earth doped fiber 13, and is input to the AOM 14. The AOM 14 is controlled to repeatedly switch between a low-loss state and a high-loss state in a cyclic manner, or is controlled to maintain a low-loss state.

In a case where the AOM 14 is controlled to repeatedly switch between a low-loss state and a high-loss state, the AOM 14 restrains transmission of spontaneous emission light when in a high-loss state, and passes spontaneous emission light when in a low-loss state. Therefore, when the AOM 14 is in a low-loss state, spontaneous emission light is input to the second FBG 15 via the AOM 14. The second FBG 15 selectively reflects light in a wavelength band including the wavelength $\lambda 1$, at a reflectivity of approximately 50% or lower. Therefore, the reflected spontaneous emission light is input back to the rare-earth doped fiber 13 via the AOM 14, and is amplified by stimulated emission from the rare-earth element in the rare-earth doped fiber 13. The amplified light then reaches the first FBG 12. The first FBG 12 selectively reflects light in a wavelength band including the wavelength $\lambda 1$, at a reflectivity of 99.5%, for example. Therefore, the light reflected by the first FBG 12 is input back to the rare-earth doped fiber 13, and is then amplified. The amplified light is then input to the second FBG 15 via the AOM 14, and part of the light passes through the second FBG 15. In the above manner, the first FBG 12 and the second FBG 15 form a Fabry-Perot oscillator. In synchronization with the operation of the AOM 14 repeatedly switching between a low-loss state and a high-loss state, pulsed light is amplified, and the amplified pulsed light is output as seed laser light from the second FBG 15. The wavelength $\lambda 1$ of the seed laser light output from the seed laser light source 10 is 1064 nm, for example, and the pulse recurrence frequency is 100 kHz, for example.

In a case where the AOM 14 is controlled to maintain a low-loss state, seed laser light that is continuous light at the same wavelength is output from the seed laser light source 10.

At the seed laser light source 10, the output of seed laser light as pulsed light or continuous light is controlled, or the intensity of the light is controlled, as the AOM 14 is controlled by a control signal from the control unit 60.

The laser light output from the seed laser light source 10 is input to the optical coupler 40.

Meanwhile, the pumping light source 20 is formed with laser diodes that output pumping light, and the intensity of the output pumping light is adjusted by a control signal from the control unit 60. The pumping light source 20 outputs pumping light that puts the rare-earth element in the amplification optical fiber 30 into a pumped state, and the pumping light output from the pumping light source 20 is input to the optical coupler 40. The wavelength of the pumping light output from the pumping light source 20 is 975 nm, for example.

The optical coupler 40 includes: an input port 41 to which laser light from the seed laser light source 10 is input; a pumping light input port 42 to which pumping light from the pumping light source 20 is input; and an output port 43 that outputs the seed laser light from the seed laser light source 10 and the pumping light. The input port 41 is formed with a single-mode fiber that allows the seed laser light from the seed laser light source 10 to propagate as single-mode light. The pumping light input port 42 is formed with a multi-mode fiber that allows the pumping light output from the pumping light source 20 to propagate as multi-mode light. The output port 43 is formed with a double-clad fiber including a core, a clad coating the core, and a plastic clad coating the clad. The output port 43 is designed to allow the seed laser light to propagate as single-mode light through the core, and the pumping light to propagate as multi-mode light through the core and the clad. The seed laser light and the pumping light output from the output port 43 are input to the amplification optical fiber 30.

The amplification optical fiber 30 is formed with a double-clad fiber that includes: a core doped with a rare-earth element; a clad coating the core; and a plastic clad coating the clad. The core allows the seed laser light output from the optical coupler 40 to propagate as single-mode light, and the core and the clad allow the pumping light output from the optical coupler 40 to propagate as multi-mode light. When the pumping light passes through the core, the rare-earth element doped in the core is pumped. The pumped rare-earth element causes stimulated emission with the seed laser light propagating through the core. The seed laser light is amplified by the stimulated emission. In the amplification optical fiber 30, the diameter of the core is 10 μm, the outer diameter of the clad is 125 μm, and the core is doped with erbium as the rare-earth element.

The output unit 50 outputs the laser light amplified by the amplification optical fiber 30 to the outside of the fiber laser device 100. In a case where pulsed seed laser light is output from the seed laser light source 10 as described above, the output unit 50 outputs pulsed laser light that is synchronized with the seed laser light output from the seed laser light source 10.

The output setting unit 63 sets the intensity of the laser light output from the output unit 50, and inputs an output setting instruction based on the set intensity of the laser light, to the control unit 60.

The output instructing unit 65 inputs an output instruction for causing the output unit 50 to output laser light, to the control unit 60.

Based on the output setting instruction from the output setting unit 63 and the output instruction from the output instructing unit 65, the control unit 60 controls the seed laser light source 10 and the pumping light source 20. Specifically, by controlling the laser oscillator 11 and the AOM 14 in the seed laser light source 10, the control unit 60 controls whether the seed laser light source 10 outputs seed laser light, controls the intensity of the seed laser light, and controls the seed laser light to turn into pulsed light or continuous light. Further, by controlling the pumping light source 20, the control unit 60 controls whether the pumping light source 20 outputs pumping light, and controls the intensity of the pumping light output from the pumping light source 20.

The memory 67 stores the intensity of the pumping light for causing the output unit 50 to output laser light having the intensity set by the output setting unit 63, and the intensity of the pumping light prior to the output of the laser light from the output unit 50. The stored intensities are associated with output setting instructions. The intensity of the pumping light prior to the output of the laser light is such that the period of time required for the intensity of laser light output from the output unit 50 to be stabilized after the laser light is output from the output unit 50, in a case where pumping light is input to the amplification optical fiber for a predetermined period of time prior to the output of the laser light. That is, in a case where the intensity of the pumping light in an output state is high as the intensity of laser light output from the output unit 50 in the output state is high, the intensity of the pumping light prior to the output of the laser light is set at a high value. In a case where the intensity of the pumping light in an output state is low as the intensity of laser light output from the output unit 50 in the output state is low, the intensity of the pumping light prior to the output of the laser light is set at a low value. The intensity of the pumping light is determined beforehand based on the intensity of laser light set by the output setting unit 63, and is then stored into the memory 67.

Figure 3:
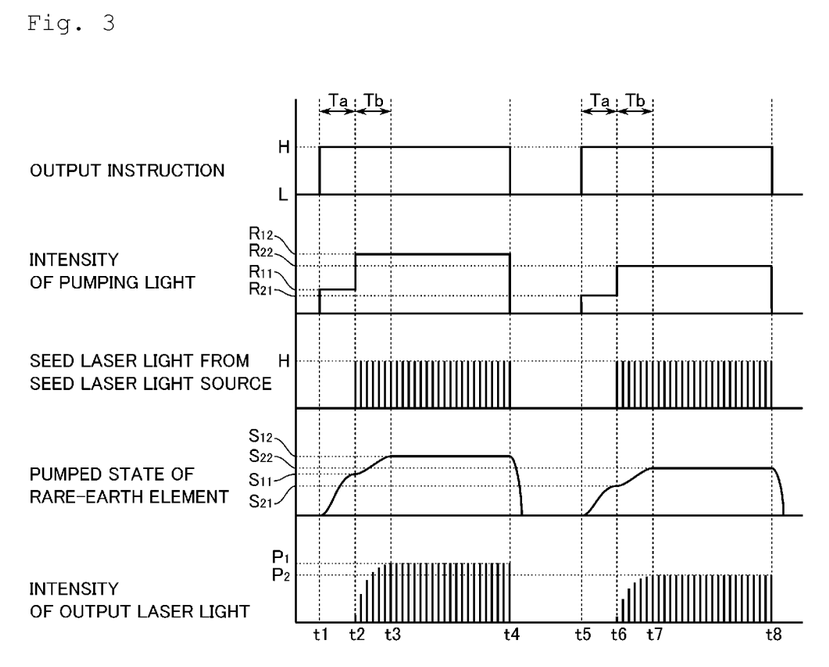
FIG. 3 is a timing chart schematically showing operations of the fiber laser device of FIG. 1.

Referring now to FIG. 3, operations of the fiber laser device 100 are described.

FIG. 3 is a timing chart schematically showing operations of the fiber laser device 100.

FIG. 3 schematically shows an output instruction input from the output instructing unit 65 to the control unit 60, the intensity of pumping light output from the pumping light source 20, the intensity of seed laser light output from the seed laser light source 10, the pumped state of the rare-earth element of the amplification optical fiber 30, and the intensity of laser light output from the output unit 50. In FIG. 3, where the output instruction is at H, the output instructing unit 65 is issuing the output instruction to the control unit 60. Where the intensity of the pumping light is higher, the pumping light source 20 is outputting pumping light with a higher intensity. Where the intensity of the seed laser light from the seed laser light source is higher, the seed laser light source 10 is outputting seed laser light with a higher intensity. Where the level of the pumped state of the rare-earth element is higher, the rare-earth element of the amplification optical fiber 30 is in a pumped state at a higher level. Where the intensity of the output laser light is higher, the output unit 50 is outputting laser light with a higher intensity.

First, a power supply (not shown) for the fiber laser device 100 is switched on, to supply power to the control unit 60.

Supplied with power, the control unit 60 awaits an output setting instruction from the output setting unit 63. When the intensity of the laser light output from the output unit 50 is set at an intensity P1 by the output setting unit 63, an output setting instruction based on this setting is input to the control unit 60. At this point, the control unit 60 stores this output setting instruction.

At time t1, the output instruction is input from the output instructing unit 65 to the control unit 60. The control unit 60 then controls the pumping light source 20 to enter a pre-pumped state, and reads a predetermined pre-pumping light intensity R11 based on the stored output setting instruction, from the memory 67. The control unit 60 then controls the pumping light source 20 to output pre-pumping light with the intensity R11 read from the memory 67 for a predetermined period Ta. The control unit 60 further controls the seed laser light source 10 to enter a pre-pumped state, so that the seed laser light is not output. It should be noted that the controlling the seed laser light source 10 includes issuing no instructions to the seed laser light source 10. At this point, only the pre-pumping light is input to the amplification optical fiber 30. Therefore, the level of the pumped state of the rare-earth element in the amplification optical fiber 30 is gradually made higher. The pre-pumping light intensity R11 at this point is 2 W, for example, and the predetermined period Ta is 100 μs, for example.

Therefore, at the end of the pre-pumped state after the predetermined period Ta has passed since time t1, the level of the pumped state of the rare-earth element is expressed as a predetermined pumped state S11, based on the intensity P1 of the output laser light.

At time t2 after the predetermined period Ta has passed since time t1, the control unit 60 puts the pumping light source 20 into an output state, and reads a pumping light intensity R12 corresponding to the stored output setting instruction, from the memory 67. The control unit 60 then controls the pumping light source 20, so that the pumping light source 20 outputs pumping light with the intensity R12. At time t2, the control unit 60 further controls the seed laser light source 10, so that the seed laser light source 10 outputs pulsed seed laser light having an intensity H as the crest value and the wavelength λ1. Specifically, the intensity R12 of the pumping light in the output state is 6 W, for example, and the intensity H as the crest value of the seed laser light is 4 W, for example.

In the output state, the pumping light with the intensity R12 is output from the pumping light source 20, and the seed laser light is output from the seed laser light source 10. The rare-earth element in the amplification optical fiber 30 is then pumped at an even higher level, and causes stimulated emission, to amplify the intensity of the seed laser light. As a result, amplified pulsed laser light is output from the amplification optical fiber 30, and the amplified pulsed laser light is output from the output unit 50.

At a point immediately after time t2, however, the intensity of the laser light output from the output unit 50 has not yet reached the intensity P1 set by the output setting unit 63. At time t3 after a period Tb has passed since t2, the pumped state of the rare-earth element is represented by S12. In this manner, laser light with the intensity P1 set by the output setting unit 63 is output from the output unit 50, and the laser light output is stabilized. The period from time t2 to time t3 (the period Tb) is the rise time of the laser light that is output from the output unit 50. For example, in the case of the first laser light output after the power supply is switched on, the period Tb is 50 μs or shorter, where the intensity R11 of the pre-pumping light is 2 W as described above, the predetermined period Ta is 100 μs, the intensity R12 of the pumping light in the output state is 6 W, and the intensity H as the crest value of the seed laser light is 4 W.

The intensity of the pre-pumping light that is output from the pumping light source 20 in the pre-pumped state is now described. In the pre-pumped state, the pre-pumping light with the intensity R11 is output for the predetermined constant period Ta (t1 to t2). The rare-earth element then enters the predetermined pumped state S11 based on the laser light intensity P1 that is set by the output setting unit 63. The predetermined pumped state S11 is such that laser light rises in the predetermined period Tb when pumping light with the intensity R12 is output from the pumping light source 20, and seed laser light having the intensity H as the crest value is output from the seed laser light source, so that laser light with the intensity P1 set by the output setting unit 63 is output in the output state. The pre-pumping light intensity R11 in the pre-pumped state is such that the rare-earth element enters the predetermined pumped state S11 at time t2 when the pre-pumped state comes to an end. That is, the intensity R11 of the pre-pumping light that is output from the pumping light source 20 in the pre-pumped state is such that the rise period Tb becomes a constant period of time, regardless of the laser light intensity that is set by the output setting unit 63.

The pre-pumping light intensity R11 is determined beforehand based on the laser light intensity P1 that is set by the output setting unit 63 so that the rise period becomes Tb when seed laser light having the intensity H as the crest value and pumping light with the intensity R12 are input to the amplification optical fiber 30. The pre-pumping light intensity R11 is then stored into the memory 67, as described above.

At time t4, the input of the output instruction from the output instructing unit 65 stops. The control unit 60 then stops the output of the seed laser light from the seed laser light source 10 and the output of the pumping light from the pumping light source 20. As a result, the output of the laser light from the output unit 50 is stopped. The control unit 60 again awaits an output instruction from the output instructing unit 65 and an output setting instruction from the output setting unit 63.

Next, a laser output with a different intensity from the intensity P1 of the laser output in the period from time t3 to time t4 is described.

When the intensity of the laser light that is output from the output unit 50 is set at an intensity P2 different from the laser light intensity in the period from time t3 to time t4 by the output setting unit 63 between time t4 and time t5, an output setting instruction based on this setting is input to the control unit 60. At this point, the control unit 60 stores this output setting instruction.

At time t5, the output instruction is input from the output instructing unit 65 to the control unit 60. The control unit 60 then controls the pumping light source 20 to enter a pre-pumped state, and reads a predetermined pre-pumping light intensity R21 based on the output setting instruction, from the memory 67. The control unit 60 then controls the pumping light source 20 to output pre-pumping light with the intensity R21 read from the memory 67 for a predetermined period Ta. The control unit 60 further controls the seed laser light source 10 to enter a pre-pumped state, so that the seed laser light is not output. At this point, only the pre-pumping light is input to the amplification optical fiber 30. Therefore, the level of the pumped state of the rare-earth element in the amplification optical fiber 30 is gradually made higher. It should be noted that the duration of the period Ta of the pre-pumped state is the same as that of the period Ta of the pre-pumped state from time t1 to time t2. For example, in a case where the intensity P2 of the laser light that is output from the output unit 50 is lower than the intensity P1 as shown in FIG. 3, the pre-pumping light intensity R21 is lower than the intensity R11. For example, in a case where the pre-pumping light intensity R11 in the period from time t1 to time t2 is 2 W as described above, the intensity R21 is 1.5 W.

Therefore, at the end of the pre-pumped state after the predetermined period Ta has passed since time t5, the level of the pumped state of the rare-earth element is expressed as a predetermined pumped state S21, based on the intensity P2 of the output laser light. For example, in a case where the intensity P2 of the laser light that is output from the output unit 50 is lower than the intensity P1 as shown in FIG. 3, the pre-pumping light intensity R21 is lower than the intensity R11 as described above. Therefore, the pumped state S21 of the rare-earth element at the end of the pre-pumped state is a pumped state at a lower level than the pumped state S11.

At time t6 after the predetermined period Ta has passed since time t5, the control unit 60 puts the pumping light source 20 into an output state, and reads a pumping light intensity R22 corresponding to the output setting instruction from the memory 67. The control unit 60 then controls the pumping light source 20, so that the pumping light source 20 outputs pumping light with the intensity R22. At time t6, the control unit 60 further controls the seed laser light source 10, so that the seed laser light source 10 outputs pulsed seed laser light having the intensity H as the crest value and the wavelength λ1. The intensity R22 of the pumping light and the intensity H as the crest value of the seed laser light are such intensities that laser light with the set intensity P2 is output from the output unit 50. Specifically, the intensity R12 of the pumping light is 5 W, for example, and the intensity H as the crest value of the seed laser light is 4 W, for example.

In the output state, the pumping light with the intensity R22 is output from the pumping light source 20, and the seed laser light is output from the seed laser light source 10. The rare-earth element in the amplification optical fiber 30 is then pumped at an even higher level, and causes stimulated emission, to amplify the intensity of the seed laser light. Amplified pulsed laser light is then output from the output unit 50.

At a point immediately after time t6, however, the intensity of the laser light output from the output unit 50 has not yet reached the intensity P2 set by the output setting unit 63. At time t7 after a predetermined period Tb has passed since t6, the pumped state of the rare-earth element is represented by R22. In this manner, laser light with the intensity P2 set by the output setting unit 63 is output from the output unit 50, and the laser light output is stabilized. The period from time t6 to time t7 is the rise time of the laser light that is output from the output unit 50.

In the pre-pumped state, the pre-pumping light with the intensity R21 is output for the predetermined constant period Ta (t5 to t6). The rare-earth element then enters the predetermined pumped state S21 based on the laser light intensity P2 that is set by the output setting unit 63. The predetermined pumped state S21 is such that laser light rises in the predetermined period Tb when pumping light with the intensity R22 is output from the pumping light source 20, and seed laser light having the intensity H as the crest value is output from the seed laser light source 10, so that laser light with the intensity P2 set by the output setting unit 63 is output in the output state. The pumping light intensity R21 in the pre-pumped state is such that the rare-earth element enters the predetermined pumped state at time t6 when the pre-pumped state comes to an end. That is, the pre-pumping light intensity R21 is set based on the laser light intensity P2 set by the output setting unit 70, so that the duration of the rise period Tb from time t6 to time t7 becomes the same as that of the rise period from time t2 to time t3.

The pre-pumping light intensity R21 is determined beforehand, so that the rise period becomes Tb when seed laser light and pumping light with the intensity R22 are input to the amplification optical fiber 30.

At time t8, the input of the output instruction from the output instructing unit 65 stops. The control unit 60 then stops the output of the laser light from the seed laser light source 10 and the output of the pumping light from the pumping light source 20. As a result, the output of the laser light from the output unit 50 is stopped.

In the fiber laser device 100 according to this embodiment, when an output instruction is input from the output instructing unit 65 to the control unit 60, the control unit 60 controls the seed laser light source 10 not to output seed laser light in a pre-pumped state, and controls the pumping light source 20 so that pumping light is input to the amplification optical fiber 30 for the predetermined period Ta. Therefore, the level of the pumped state of the rare-earth element in the amplification optical fiber 30 is gradually made higher. The control unit 60 then puts the seed laser light source 10 and the pumping light source 20 into an output state, so that pumping light and seed laser light are input to the amplification optical fiber 30. Since the level of the pumped state of the rare-earth element in the amplification optical fiber 30 is made higher in the pre-pumped state, the rise period Tb of the laser light that is output from the output unit can be made shorter when the pre-pumped state is switched to the output state.

The control unit 60 also sets the intensity of the pumping light in the pre-pumped state at the intensity R11 (R21) based on the laser light intensity P1 (P2) that is set by the output setting unit 63. That is, in a case where the intensity of the pumping light in an output state is high as the intensity of the laser light output from the output unit 50 in the output state is high, the intensity of the pumping light in the pre-pumped state is set at a high value. In a case where the intensity of the pumping light in an output state is low as the intensity of the laser light output from the output unit 50 in the output state is low, the intensity of the pumping light in the pre-pumped state is set at a low value. Therefore, the pumped state S11 (S21) of the rare-earth element at the end t2 (t6) of the pre-pumped state is a high pumped state when the intensity of the laser light output from the output unit is high in the output state, and the pumped state S11 (S21) is a low pumped state when the intensity of the laser light output from the output unit is low in the output state. Accordingly, in the output state, it is possible to restrain variations of the period Tb from an input of laser light and pumping light to the amplification optical fiber 30 until the rise of the laser light output from the output unit.

As described above, a pre-pumped state lasts for the predetermined period Ta after an output instruction is input from the output instructing unit 65, and the laser light that is output from the output unit 50 rises in the period Tb during which variations are restrained. That is, the output of the laser light is stabilized after the period (Ta+Tb) has passed since the input of the output instruction by the output instructing unit 65, regardless of the laser beam intensity set by the output setting unit 63. Since variations are restrained during this period (Ta+Tb), the fiber laser device 100 excels in operability.

(Second Embodiment)

Figure 4:
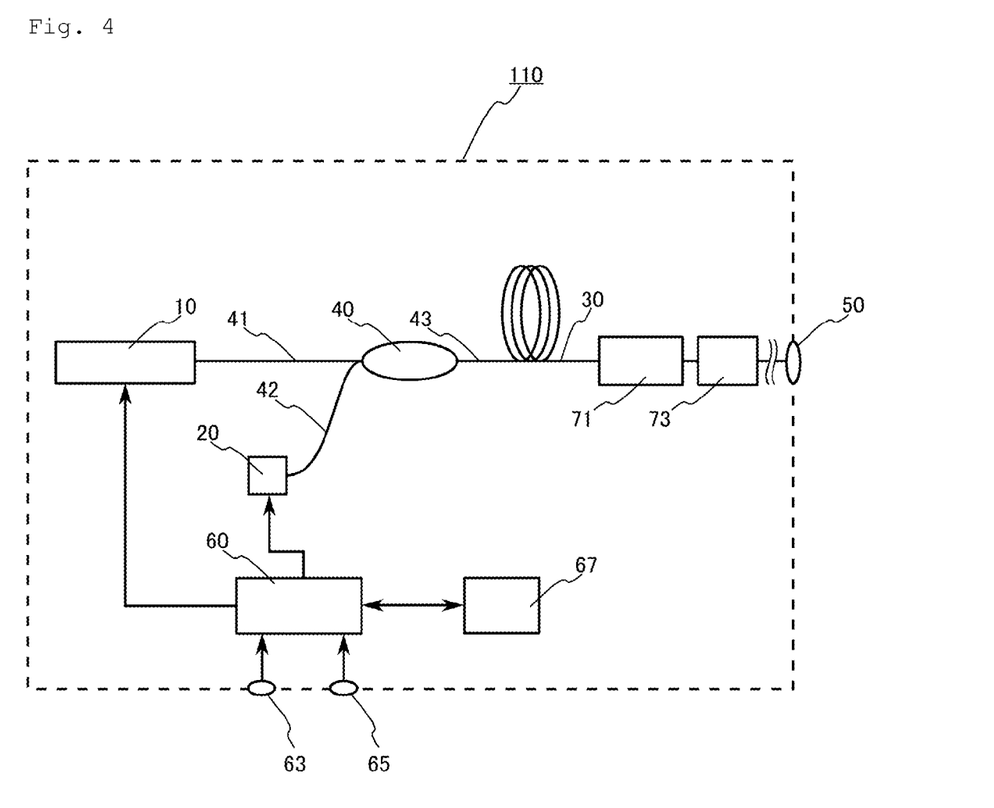
FIG. 4 is a diagram showing a fiber laser device according to a second embodiment of the invention.

Referring now to FIG. 4, a second embodiment of the invention is described in detail. It should be noted that components that are identical or similar to those in the first embodiment are denoted by the same reference numerals as those used in the first embodiment, and the same explanation will not be repeated. FIG. 4 is a diagram showing a fiber laser device according to the second embodiment of the invention.

As shown in FIG. 4, a fiber laser device 110 differs from the first embodiment in including: a wavelength converter 71 that is provided between the amplification optical fiber 30 and the output unit 50, and receives light that is output from the amplification optical fiber 30; and a optical filter 73 that is provided between the wavelength converter 71 and the output unit 50, and receives light that is output from the wavelength converter 71.

The wavelength converter 71 is formed with an optical fiber that causes stimulated Raman scattering. In a case where the crest value of the intensity of input light is large, this wavelength converter converts the wavelength of the light into a longer wavelength, and then outputs the longer-wavelength light. In a case where the crest value of the intensity of input light is small, this wavelength converter does not convert the wavelength of the light, and outputs the light as it is. Specifically, when pre-pumping light is input from the pumping light source 20 to the amplification optical fiber 30 in a pre-pumped state, the amplification optical fiber 30 generates spontaneous emission light. This spontaneous emission light is amplified by the amplification optical fiber 30, and is output. The spontaneous emission light is then input to the wavelength converter 71. However, the crest value of the intensity of the light that is output from the amplification optical fiber 30 at this point is small, and the wavelength converter 71 is designed not to convert the wavelength of the light that is input at this point. In an output state, on the other hand, seed laser light is output from the seed laser light source 10, and pumping light is output from the pumping light source 20. The amplification optical fiber 30 amplifies the seed laser light, and outputs the seed laser light as laser light. The laser light is then input to the wavelength converter 71. The crest value of the intensity of the laser light that is input at this point is large, and the wavelength converter 71 is designed to convert the wavelength of the laser light that is input at this point.

When laser light with the wavelength $\lambda 1$ is input to the wavelength converter 71 that is to perform wavelength conversion, the wavelength converter 71 converts the input light into light with a wavelength $\lambda 2$ that is longer than the wavelength $\lambda 1$. Therefore, light with a longer wavelength than that of the input light is output from the wavelength converter 71.

Examples optical fibers for such wavelength conversions include an optical fiber that is formed with a core and a clad, with the core being doped with a dopant that increases a nonlinear optical constant. Examples of such dopants include germanium and phosphorus. For example, the wavelength converter 71 is a single-mode fiber that has 7 to 8 mass percent of germanium doped in the core thereof. The diameter of the core is 5 µm, and the length of the single-mode fiber is 20 m. When the intensity as the crest value of pulsed light is 70 W or higher, and light with the wavelength $\lambda 1$ of 1064 nm is input, the wavelength converter 71 outputs light with the wavelength $\lambda 2$ of 1120 nm. When light with an intensity of 70 W or lower is input, the wavelength converter 71 does not perform wavelength conversion. The threshold value of the crest value in wavelength conversions by the wavelength converter 71 can be changed with the diameter of the core, the density of the dopant to be added, the length, or the like. Therefore, the diameter of the core, the density of the dopant to be added, and the length of the wavelength converter 71 of this embodiment are set so that wavelength conversion is performed when the crest value of light with a wavelength of 1120 nm is larger than 70 W, and no wavelength conversions are performed when the crest value is smaller than that. On the other hand, in a case where the diameter of the core, the density of the dopant to be added, and the length of the wavelength converter 71 are determined in advance, the outputs of the seed laser light source 10 and the pumping light source 20 are set to achieve a crest value of input light such that no wavelength conversions are performed in a pre-pumped state, but wavelength conversion is performed in an output state.

In a case where light in the same wavelength band as seed laser light that is output from the seed laser light source 10 and has the wavelength $\lambda 1$ is input via the wavelength converter 71, the optical filter 73 passes input light that has its wavelength converted by the wavelength converter 71 and has the wavelength $\lambda 2$, but restrains transmission of input light that does not have wavelength converted by the wavelength converter 71 and has the wavelength $\lambda 1$. Accordingly, in a case where laser light with a high intensity and the wavelength $\lambda 1$ is output from the amplification optical fiber 30, and the wavelength of the laser light is converted into the wavelength $\lambda 2$ by the wavelength converter 71, the laser light that is input to the optical filter 73 passes through the optical filter 73. On the other hand, in a case where laser light with a low intensity and the wavelength $\lambda 1$ is output from the amplification optical fiber 30, and the wavelength of the laser light is not converted by the wavelength converter 71, transmission of the laser light that is input to the optical filter 73 is restrained by the optical filter 73.

The optical filter 73 is formed with a dielectric multilayer filter, a photonic bandgap fiber, or the like. For example, in a case where laser light with the wavelength $\lambda 1$ of 1064 nm is input to the wavelength converter 71, the wavelength is converted by the wavelength converter 71, and laser light with the wavelength $\lambda 2$ of 1120 nm is input to the optical filter 73, the laser light passes through the optical filter 73. On the other hand, in a case where laser light with the wavelength $\lambda 1$ of 1064 nm is input to the wavelength converter 71, the wavelength is not converted by the wavelength converter 71, and laser light of 1064 nm is input to the optical filter 73, transmission of the laser light is restrained by the optical filter 73.

Next, operations of the fiber laser device 110 are described.

In the fiber laser device 110, pre-pumping light is output for the predetermined constant period Ta (t1 to t2, t5 to t6) in a pre-pumped state. After that, in an output state, the laser light that is output from the output unit rises in the period Tb (t2 to t3, t6 to t7). The intensity of the pre-pumping light at this point is such that the period Tb required for the laser light output from the output unit 50 in the output state to be stabilized becomes constant, regardless of the intensity of the laser light output from the output unit 50.

In the above described pre-pumped state, the pre-pumping light that is input to the amplification optical fiber 30 causes the amplification optical fiber 30 to generate spontaneous emission light. This spontaneous emission light is amplified by the amplification optical fiber 30, and is output. The spontaneous emission light is then input to the wavelength converter 71. However, the wavelength of the light that is output from the amplification optical fiber 30 at this point is not converted by the wavelength converter 71 as described above. Accordingly, transmission of the light that is input from the wavelength converter 71 to the optical filter 73 is restrained by the optical filter. As a result, light is not output from the output unit 50 in the pre-pumped state.

In a case where the wavelength converter 71 is a 20-m long single-mode fiber, the core is made of quartz doped with 7 to 8 mass percent of germanium, and the diameter of the core is 5 µm as described above, the light that is amplified and output by the amplification optical fiber 30 and is input to the wavelength converter 71 in the pre-pumped state does not have its wavelength converted by the wavelength converter 71, if the intensity R1 of the pre-pumping light is 2 W.

Next, in the period (t2 to t4, t6 to t8) during which the pumping light source and the seed laser light source are put into an output state, pumping light with intensity R12 or R22 is output from the pumping light source 20, and pulsed seed laser light that has the intensity H as its crest value and has the wavelength $\lambda 1$ is output from the seed laser light source 10. The laser light that is output from the amplification optical fiber 30 at this point has its wavelength converted by the wavelength converter 71 as described above. Accordingly, the laser light that is input from the wavelength converter 71 to the optical filter 73 passes through the optical filter, and is output from the output unit 50. For example, in a case where the wavelength converter 71 is a 20-m long single-mode fiber, the core is made of quartz doped with 7 to 8 mass percent of germanium, and the diameter of the core is 5 µm as described above, the crest value of the laser light that is input to the wavelength converter 71 is 185 W, and the wavelength of the laser light is converted, if the intensity R12 of the pumping light in the output state is 6 W, and the intensity H as the crest value of the seed laser light is 4 W.

In the above described fiber laser device 110, when laser light that is amplified by the amplification optical fiber 30 is output in an output state, the wavelength of the laser light is converted by the wavelength converter 71. The laser light having its wavelength converted by the wavelength converter 71 is input to the optical filter 73. The laser light then passes through the optical filter 73, and is output from the output unit 50. In a pre-pumped state, on the other hand, the rare-earth element in the amplification optical fiber 30 is pumped by pre-pumping light. The amplification optical fiber 30 is designed so that seed laser light output from the seed laser light source 10 is amplified through stimulated emission from the rare-earth element that is pumped by pumping light. In the pre-pumped state, however, the seed laser light is not input to the amplification optical fiber 30. Accordingly, only the spontaneous emission light generated by the pumped rare-earth element is output from the amplification optical fiber 30. The spontaneous emission light has a great spectrum width and a low intensity as its crest value. Even when the light obtained by amplifying the spontaneous emission light is input from the amplification optical fiber 30 in the pre-pumped state, the wavelength converter 71 does not perform wavelength conversion. Accordingly, even in a case where light obtained by amplifying the spontaneous emission light is output from the amplification optical fiber 30, transmission of light with the wavelength λ1 that is output from the wavelength converter 71 and is input to the optical filter 73 is restrained by the optical filter 73. In this manner, in the pre-pumped state, the output unit 50 is restrained from outputting unnecessary light.

In this embodiment, at time t4, the control unit 60 stops the output of seed laser light from the seed laser light source 10 and the output of pumping light from the pumping light source 20, as in the first embodiment. However, in the period from time t4 to time t6, the seed laser light source 10 may output seed laser light, and the pumping light source 20 may output pumping light. However, the output intensity of the seed laser light from the seed laser light source 10 and the output intensity of the pumping light from the pumping light source 20 are lower than the crest value at which the wavelength of light that is input to the wavelength converter 71 is converted by the wavelength converter 71. Since the output intensity of the seed laser light from the seed laser light source 10 and the output intensity of the pumping light from the pumping light source 20 are set as above, laser light is not output from the output unit 50 in the period from time t4 to time t6. As the output from the seed laser light source 10 and the pumping light source 20 is not completely stopped as above, the seed laser light source 10 and the pumping light source 20 can perform more stable operations.

Also, in this embodiment, the wavelength converter 71 is formed with an optical fiber that causes stimulated Raman scattering. However, this wavelength converter is not necessarily an optical fiber, as long as this wavelength converter has the function to convert the wavelength of input light into a different wavelength and output the wavelength-converted light when the crest value of the intensity of the input light is large, and the function not to convert the wavelength of input light but to output the light as it is when the crest value of the intensity of the input light is small. For example, the wavelength converter 71 may be a nonlinear optical crystal such as lithium triborate ($LoB_3O_5$) that generates second harmonics. Such a nonlinear optical crystal outputs the second harmonics (light with a ½ wavelength) when light with an intensity equal to or higher than a predetermined crest value is input. In a case where a nonlinear optical crystal that generates the second harmonics is used as the wavelength converter 71, a filter that passes the wavelength of the second harmonics is used as the optical filter 73, with transmission of the wavelength of light input to the wavelength converter 71 being restrained.

(Third Embodiment)

Figure 5:
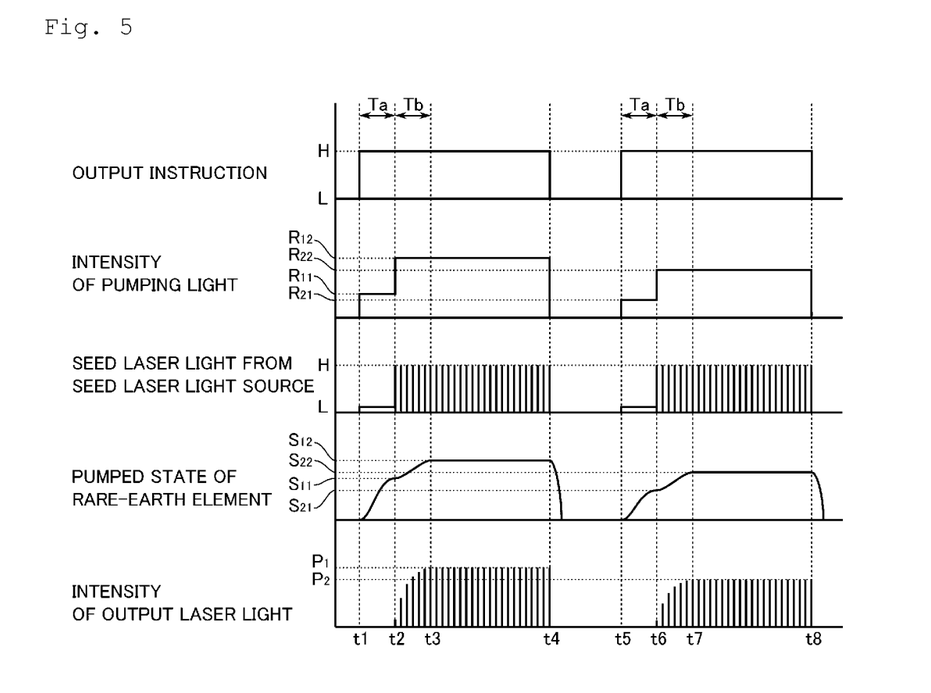
FIG. 5 is a timing chart schematically showing operations of the fiber laser device according to a third embodiment of the invention.

Referring now to FIG. 5, a third embodiment of the invention is described in detail. It should be noted that components that are identical or similar to those in the first and second embodiments are denoted by the same reference numerals as those used in the first and second embodiments, and the same explanation will not be repeated. This embodiment is a fiber laser device using the fiber laser device 110 described in the second embodiment.

FIG. 5 is a timing chart illustrating operations of the fiber laser device 110 according to the third embodiment of the invention. The fiber laser device 110 of this embodiment differs from the fiber laser device 110 of the second embodiment in that, in a pre-pumped state, pre-pumping light is output from the pumping light source 20, and weak seed laser light is output from the seed laser light source 10.

Specifically, as shown in FIG. 5, at time t1 (t5), an output instruction is input from the output instructing unit 65. The control unit 60 then sets a pre-pumped state, and reads the predetermined pre-pumping light intensity R11 (R21) based on a stored output setting instruction, from the memory 67. The control unit 60 then controls the pumping light source 20 to output pre-pumping light with the intensity R11 read from the memory 67 for the predetermined period Ta. The control unit 60 further controls the seed laser light source 10 to output weak seed laser light with a predetermined constant intensity L. This weak seed laser light is continuous light.

Pumping light that is output from the pumping light source 20, and the weak seed laser light that is output from the seed laser light source are input to the amplification optical fiber 30. In the amplification optical fiber 30, emission of the rare-earth element is stimulated by the weak seed laser light, and the weak seed laser light is amplified by the stimulated emission of the rare-earth element. The amplified weak seed laser light is output from the amplification optical fiber 30, and is input to the wavelength converter 71. However, even when the output light that has been amplified by the amplification optical fiber 30 is input to the wavelength converter 71, the wavelength converter 71 does not convert the wavelength of the input light. Accordingly, transmission of the light that is input from the wavelength converter 71 to the optical filter 73 is restrained by the optical filter. As a result, light is not output from the output unit 50 in the pre-pumped state. For example, in a case where the wavelength converter 71 is a 20-m long single-mode fiber, the core is made of quartz doped with 7 to 8 mass percent of germanium, and the diameter of the core is 5 μm as described above, the intensity L of the weak seed laser light in the pre-pumped state is 1 W. If the intensity of the pre-pumping light is 2 W, the wavelength converter 71 does not perform wavelength conversion.

In the fiber laser device 110 according to this embodiment, seed laser light is input to the amplification optical fiber 30 in the pre-pumped state. Accordingly, pumping of the rare-earth element by the pumping light and relaxing of the rare-earth element by the seed laser light can be balanced. Thus, the rare-earth element is not so pumped as to be unstable, and unintended laser oscillation can be restrained in the pre-pumped state.

Further, when laser light that has been amplified by the amplification optical fiber 30 is output in an output state, the wavelength of the laser light is converted by the wavelength converter 71. The laser light having its wavelength converted is input to the optical filter 73. The laser light then passes through the optical filter 73, and is output from the output unit 50. In the pre-pumped state, on the other hand, stimulated emission light is generated from the amplification optical fiber 30. As a result, the weak seed laser light is amplified, and laser light with the wavelength λ1 is output. In the pre-pumped state, however, the laser light that is output from the amplification optical fiber 30 does not have its wavelength converted by the wavelength converter 71. Accordingly, transmission of the laser light that is input from the wavelength converter 71 to the optical filter 73 is restrained by the optical filter 73. In this manner, outputting unnecessary light can be restrained in the pre-pumped state.

Although the invention has been described with reference to the first, second, and third embodiments as examples, the invention is not limited to them.

For example, in the first embodiment, the control unit 60 controls the seed laser light source 10 not to output laser light in the pre-pumped state. However, the invention is not limited to that. For example, in the pre-pumped state, the control unit 60 may control the seed laser light source 10 to output weak seed laser light. With this arrangement, the seed laser light is input to the amplification optical fiber 30 in the pre-pumped state. Accordingly, pumping of the rare-earth element by the pumping light and relaxing of the rare-earth element by the seed laser light can be balanced. Thus, the rare-earth element is not so pumped as to be unstable, and unintended laser oscillation can be restrained in the pre-pumped state.

In this case, the pumping light and the weak seed laser light are input to the amplification optical fiber 30 in the pre-pumped state. Accordingly, laser light that is generated by amplifying the weak seed laser light is output from the amplification optical fiber 30. However, the intensity of the weak seed laser light that is input to the amplification optical fiber 30 is very low. Therefore, the laser light that is output from the amplification optical fiber 30 is also weak, and does not present any problem in operating the fiber laser device 100.

Also, in the first, second, and third embodiments, a laser output device of a Fabry-Perot type is used as the seed laser light source 10. However, a laser output device of a fiber ring type may also be used. Further, the seed laser light that is output from the seed laser light source in the output state is pulsed light in the above embodiments. However, the seed laser light may be continuous light.

Also, in the first, second, and third embodiments, the intensity of the pumping light that is output from the pumping light source 20 in the pre-pumped state is lower than the intensity of the pumping light that is output from the pumping light source 20 in the output state. However, the invention is not limited to that. For example, the pumping light that is output from the pumping light source 20 in the pre-pumped state may have the same intensity as the intensity of the pumping light that is output from the pumping light source 20 in the output state, as long as the laser light rise period Tb does not vary. In this case, the pumping light source 21 should be put into the same state between the output preparing state and the output state. Accordingly, the load on the control unit can be reduced.

Further, the amplification optical fiber 30 allows laser light to propagate as single-mode light in the above embodiments. However, the amplification optical fiber 30 may be capable of allowing multi-mode light to propagate.

Also, as long as the output setting unit 63 can input an output setting instruction to the control unit 60, the output setting instruction may be generated outside the fiber laser device, and be input to the control unit 60 via the output setting unit 63.

Likewise, as long as the output instructing unit 65 can input an output instruction to the control unit 60, the output instruction may be generated outside the fiber laser device, and be input to the control unit 60 via the output instructing unit 65.

Figure 6:
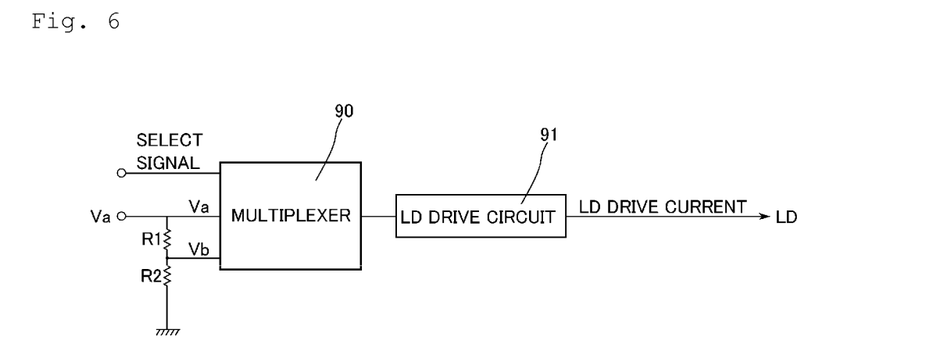
FIG. 6 is a block diagram showing blocks in a control unit controlling the pumping light source.

Also, the pumping light that is output from the pumping light source 20 can be controlled in the following manner, for example. FIG. 6 is a block diagram showing the blocks in the control unit 60 controlling the pumping light source 20. In the blocks that control the pumping light source 20, a voltage based on the settings made by the output setting unit 63 is input as a voltage Va to a multiplexer 90, and a divided voltage Vb is also input to the multiplexer 90 via resistances r1 and r2. Further, a select signal A or B for selecting the voltage Va or Vb is input from the control unit 60 to the multiplexer 90. The divided voltage Vb is expressed as Vb=Va×(r1/(r1+r2)).

The output of the multiplexer 90 is connected to a LD drive circuit 91 of the pumping light source 20. In accordance with the voltage output from the multiplexer 90, the LD drive circuit 91 outputs a LD drive current, and the intensity of the pumping light that is output from the LD of the pumping light source 20 varies with the drive current.

When a select signal is input from the control unit 60 to the multiplexer, the multiplexer 90 outputs Va, Vb, or 0 V as an output voltage in accordance with the logic of the input signal. It should be noted that the voltage Vb can be arbitrarily set by changing the values of the resistances r1 and r2.

Figure 7:
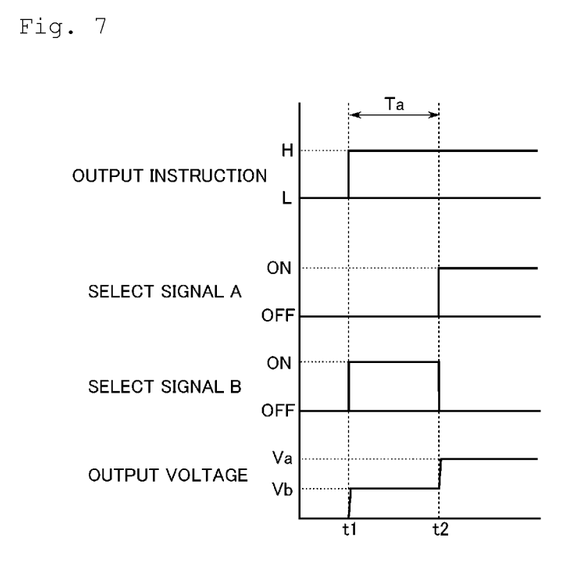
FIG. 7 is a timing chart showing the relationships among an output instruction from an output instructing unit, select signals to be input from the control unit to a multiplexer, and a voltage to be output from the multiplexer.

Next, operations of the blocks controlling the pumping light source 20 in the above manner are described. FIG. 7 is a timing chart showing the relationships among an output instruction from the output instructing unit 65, the select signals A and B to be input from the control unit 60 to the multiplexer 90, and a voltage to be output from the multiplexer 90.

In FIG. 7, before an output instruction is input from the output instructing unit 65 to the control unit 60 (before time t1), the control unit 60 outputs neither of the select signals A and B, and any select signal is not input to the multiplexer 90. Accordingly, the voltage output from the multiplexer 90 is 0 V, and the pumping light is not output from the LD of the pumping light source 20.

At time t1 when an output instruction is input from the output instructing unit 65 to the control unit 60, the control unit 60 inputs only the select signal B to the multiplexer 90 only in the predetermined period Ta (time t1 to t2). Accordingly, the voltage Vb is output from the multiplexer 90. The LD drive circuit 91 that has the voltage Vb input thereto causes the LD of the pumping light source 20 to output pre-pumping light.

At time t2 after a certain period of time has passed since time t1, the control unit 60 inputs only the select signal A to the multiplexer 90. Accordingly, the voltage Va, which is higher than the voltage Vb, is output from the multiplexer 90. The LD drive circuit 91 that has the voltage Va input thereto causes the LD of the pumping light source 20 to output pumping light with a higher intensity.

Industrial Applicability

According to the invention, a fiber laser device capable of restraining variations of the rise time of output laser light while shortening the rise time of the output laser light can be provided.

Description of Reference Numerals

10 . . . laser light source
11 . . . pumping light source
12 . . . first FBG
13 . . . rare-earth doped fiber
14 . . . AOM
15 . . . second FBG
20 . . . pumping light source
30 . . . amplification optical fiber 40 . . . optical coupler
50 . . . output unit
60 . . . control unit
63 . . . output setting unit
65 . . . output instructing unit
67 . . . memory
71 . . . wavelength converter
73 . . . optical filter

The invention claimed is:

1. A fiber laser device comprising:
a seed laser light source configured to output seed laser light;
a pumping light source configured to output pumping light;
an amplification optical fiber doped with a rare-earth element to be pumped by the pumping light and configured to receive the seed laser light and the pumping light, amplify the seed laser light, and output the amplified seed laser light as laser light;
an output unit configured to output the laser light output from the amplification optical fiber;
a control unit configured to control at least the seed laser light source and the pumping light source;
an output setting unit configured to input, to the control unit, an output setting instruction to set an intensity of the laser light output from the output unit such that the laser light output from the output unit has a variable intensity in accordance with the output setting instruction; and
an output instructing unit configured to input, to the control unit, an output instruction to cause the output unit to output the laser light, wherein
when the output instruction is input to the control unit, the control unit controls the seed laser light source and the pumping light source so that the seed laser light source and the pumping light source are switched from a pre-pumped state to an output state,
in the pre-pumped state, the seed laser light source does not output the seed laser light and the pumping light source outputs pumping light with a predetermined intensity based on the laser light intensity set by the output setting unit for a predetermined period of time,
in the output state, the seed laser light source outputs the seed laser light and the pumping light source outputs the pumping light, so that laser light with the intensity set by the output setting unit is output from the output unit, and
the control unit sets the intensity of the pumping light in said pre-pumped state in accordance with the laser light intensity set by the output setting unit such that when the laser light intensity is set to a higher value, the intensity of the pumping light in said pre-pumped state is set to a higher intensity, and when the laser light intensity is set to a lower value, the intensity of the pumping light in said pre-pumped state is set to a lower intensity.

2. The fiber laser device according to claim 1, further comprising:
a wavelength converter provided between the amplification optical fiber and the output unit, and configured not to perform wavelength conversion on light generated and output from the amplification optical fiber by the pumping light in the pre-pumped state and to perform wavelength conversion on the laser light output from the amplification optical fiber by the seed laser light and the pumping light in the output state; and
an optical filter provided between the wavelength converter and the output unit, and configured, when light in a same wavelength band as the seed laser light is input to the wavelength converter, to pass light having a wavelength thereof converted by the wavelength converter and to restrain transmission of light not having a wavelength thereof converted by the wavelength converter.

3. A fiber laser device comprising:
a seed laser light source configured to output seed laser light;
a pumping light source configured to output pumping light;
an amplification optical fiber doped with a rare-earth element to be pumped by the pumping light and configured to receive the seed laser light and the pumping light, amplify the seed laser light, and output the seed laser light as laser light;
an output unit configured to output the laser light output from the amplification optical fiber;
a control unit configured to control at least the seed laser light source and the pumping light source;
an output setting unit configured to input, to the control unit, an output setting instruction to set an intensity of the laser light output from the output unit such that the laser light output from the output unit has a variable intensity in accordance with the output setting instruction; and
an output instructing unit configured to input, to the control unit, an output instruction to cause the output unit to output the laser light, wherein
when the output instruction is input to the control unit, the control unit controls the seed laser light source and the pumping light source so that the seed laser light source and the pumping light source are switched from a pre-pumped state to an output state,
in the pre-pumped state, the seed laser light source outputs seed laser light with a very low intensity for a predetermined period of time, and the pumping light source outputs pumping light with a predetermined intensity based on the laser light intensity set by the output setting unit for the predetermined period of time,
in the output state, the seed laser light source outputs the seed laser light and the pumping light source outputs the pumping light, so that laser light with the intensity set by the output setting unit is output from the output unit, and
the control unit sets the intensity of the pumping light in said pre-pumped state in accordance with the laser light intensity set by the output setting unit such that when the laser light intensity is set to a higher value, the intensity of the pumping light in said pre-pumped state is set to a higher intensity, and when the laser light intensity is set to a lower value, the intensity of the pumping light in said pre-pumped state is set to a lower intensity.

4. The fiber laser device according to claim 3, wherein the seed laser light output from the seed laser light source in the output state is pulsed light, and the seed laser light output from the seed laser light source in the pre-pumped state is continuous light.

5. The fiber laser device according to claim 3, further comprising:
a wavelength converter provided between the amplification optical fiber and the output unit and configured not to perform wavelength conversion on light output from the amplification optical fiber by the seed laser light and the pumping light in the pre-pumped state and to perform wavelength conversion on the laser light output from the amplification optical fiber by the seed laser light and the pumping light in the output state; and
an optical filter provided between the wavelength converter and the output unit and configured, when light in a same wavelength band as the seed laser light is input to the wavelength converter, to pass light having a wavelength thereof converted by the wavelength converter and to restrain transmission of light not having a wavelength thereof converted by the wavelength converter.

6. The fiber laser device according to any one of claims 1 to 5, wherein an intensity of the pumping light in the pre-pumped state is equal to or lower than an intensity of the pumping light in the output state.

* * * * *